(12) United States Patent
Garg et al.

(10) Patent No.: US 7,502,844 B2
(45) Date of Patent: Mar. 10, 2009

(54) ABNORMALITY INDICATOR OF A DESIRED GROUP OF RESOURCE ELEMENTS

(75) Inventors: Atul Garg, Saratoga, CA (US); Joe Scarpelli, Mountain View, CA (US); Dasari Subramanyeswara Rao, Bangalore (IN); Girish Narasimha Raghavan, Bangalore (IN); Bopana Ganapathy, Bangalore (IN); Anil Kumar Sondekoppa Hanumappa, Bangalore (IN)

(73) Assignee: BMC Software, Houston, TX (US)

( * ) Notice: Subject to any disclaimer, the term of this patent is extended or adjusted under 35 U.S.C. 154(b) by 762 days.

(21) Appl. No.: 11/161,313

(22) Filed: Jul. 29, 2005

(65) Prior Publication Data

US 2007/0025389 A1    Feb. 1, 2007

(51) Int. Cl.
*G06F 15/16* (2006.01)
*G06F 15/173* (2006.01)

(52) U.S. Cl. ............. 709/223; 709/224; 709/250; 370/245; 712/11

(58) Field of Classification Search .......... 709/223, 709/224, 232, 250; 370/245; 712/11
See application file for complete search history.

(56) References Cited

U.S. PATENT DOCUMENTS

| 6,363,421 B2 * | 3/2002 | Barker et al. ............. 709/223 |
| 7,263,597 B2 * | 8/2007 | Everdell et al. ............ 712/11 |
| 2002/0165961 A1 * | 11/2002 | Everdell et al. ............ 709/225 |
| 2003/0126195 A1 * | 7/2003 | Reynolds et al. ............ 709/203 |

* cited by examiner

*Primary Examiner*—Khanh Dinh
(74) *Attorney, Agent, or Firm*—Narendra Reddy Thappeta

(57) ABSTRACT

A monitoring system provided according to an aspect of the present invention enables a user to specify one or more resource elements as a group, and compute an Abnormality Index that represents the deviation from a baseline operation of these selected resource elements. In an embodiment, the Abnormality Index is computed as a single number. The user may include any desired attributes of each resource element to be considered in determining deviations. The Abnormality Index represents the number of deviations, the seriousness of deviation (e.g., more serious if deviation relates to unavailability of the resource element), and the extent of deviation (i.e., whether the deviation is based on expected operation for hourly, daily or weekly duration).

18 Claims, 17 Drawing Sheets

Add Group

Search for Devices [　　　] [GO]

All Monitored Resources

- ☐ jserver
- ☐ jservlets
- ☐ pronet_agent
- ☐ pronet_cntl  — 540
- ☐ rate
- ☐ services
- ☐ snmpdc
- ☐ tunnelproxy
- ☐ Solaris system
- ☐ Solaris TCP
- ☐ Sybase Query
- ☐ Sybase ASA intelliscope
- ☐ Sybase ASA
- ☐ Web Transaction 550 — Group Members — 560

| Type | Path Name |
|---|---|
| Solaris Process | Lokpavani/dbsrv |  552
| Solaris Process | Lokpavani/pronet_agent | 553
| Sybase ASA Intellisc | Lokpavani/Sybase ASA | 554

[Add] [Search] [Remove]

[Close] [Finish] [Help]

*FIG. 5C*

Add Abnormality Index

Create Abnormality Index

| Configuration | Control |

640

Collect Data ☑

Event Poll Interval *  [15 min ▶] — 660
Event Poll Timeout *  [2 min ▶] — 670

* = required field

[Skip]  [Close]     [Add] [Next] [Finish] [Help]

| SAMPLE SIZE | VIOLATIONS | SIGMA | PROBABILITY |
|---|---|---|---|
| 7 | 1 | 0.3476097127 | 0 |
| 7 | 2 | 0.1216633994 | 0 |
| 7 | 3 | 0.0283881265 | 0 |
| 7 | 4 | 0.0049679221 | 0 |
| 7 | 5 | 0.0006955091 | 1 |
| 7 | 6 | 0.0000811427 | 2 |
| 7 | 7 | 0.0000081143 | 3 |

FIG. 8A

| Monitor | Rank | |
|---|---|---|
| | A(1) | A(2) |
| M(1) | 5 | 3 |
| M(2) | 5 | 3 |
| M(3) | 5 | 1 |
| M(4) | 5 | 1 |

FIG. 8B

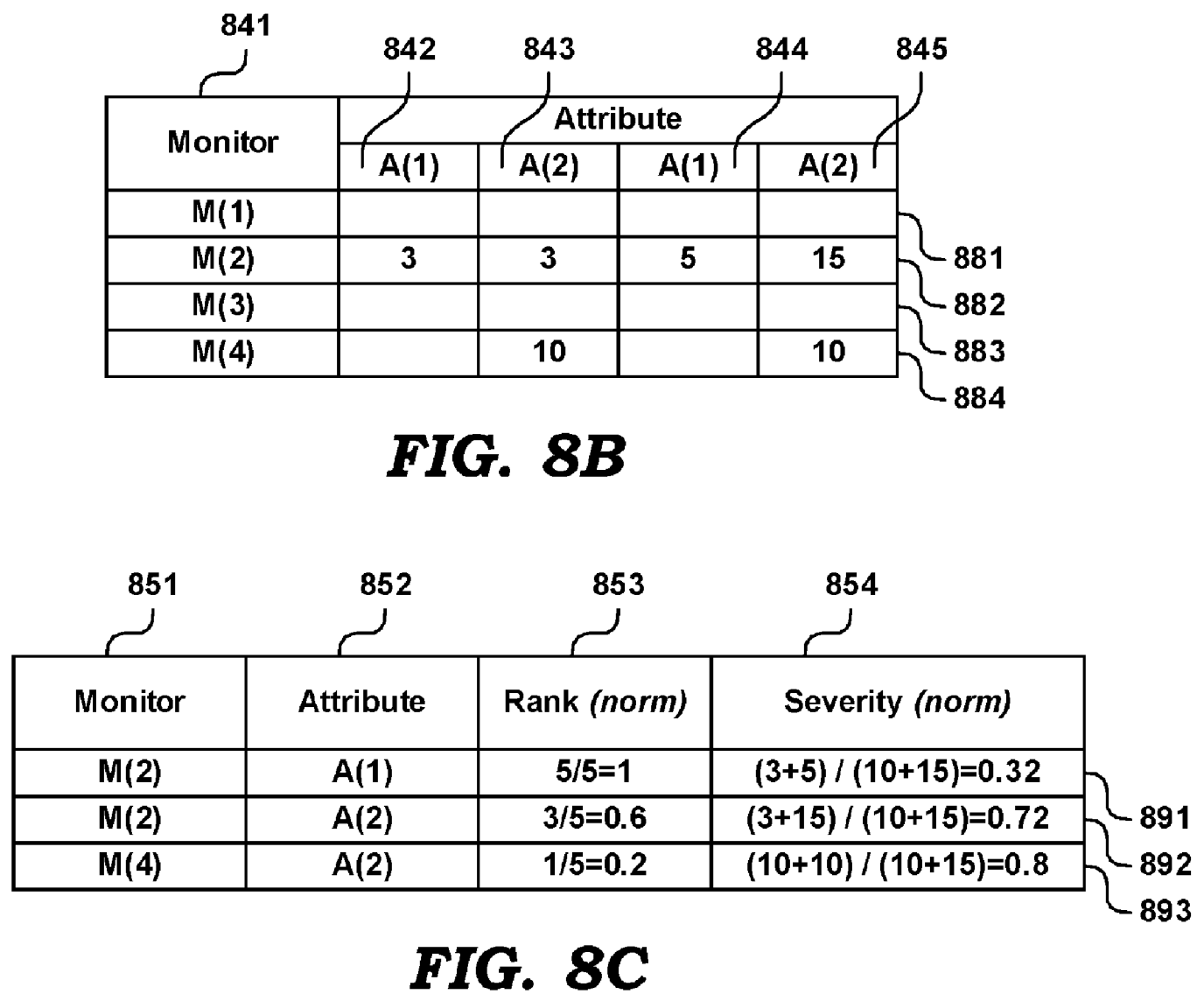

| Monitor 841 | Attribute | | | |
|---|---|---|---|---|
| | A(1) 842 | A(2) 843 | A(1) 844 | A(2) 845 |
| M(1) 881 | 3 | 3 | | |
| M(2) 882 | | | 5 | 15 |
| M(3) 883 | | | | |
| M(4) 884 | | 10 | | 10 |

FIG. 8C

| Monitor 851 | Attribute 852 | Rank *(norm)* 853 | Severity *(norm)* 854 |
|---|---|---|---|
| M(2) 891 | A(1) | 5/5=1 | (3+5) / (10+15)=0.32 |
| M(2) 892 | A(2) | 3/5=0.6 | (3+15) / (10+15)=0.72 |
| M(4) 893 | A(2) | 1/5=0.2 | (10+10) / (10+15)=0.8 |

ABNORMALITY INDICATOR OF A DESIRED GROUP OF RESOURCE ELEMENTS

RELATED APPLICATIONS

The present application is related to the following US patents and co-pending applications, which are incorporated by reference in their entirety into the present application:

U.S. Pat. No. 6,453,346; Date of Patent: Sep. 17, 2003; entitled: "Method and Apparatus for Intelligent Storage and Reduction of Network Information";

U.S. Pat. No. 6,327,677; Date of Patent: Dec. 4, 2001; entitled: "Method and Apparatus for Monitoring a Network Environment";

Co-pending application Ser. No. 10/452,134; Filed: Jun. 3, 2003, entitled, "Network Management System to Monitor Managed Elements"; and Co-pending application Ser. No. 11/160,664; Filed: Jul. 5, 2005, entitled, "Monitoring Several Distributed Resource Elements as a Resource Pool"

BACKGROUND OF THE INVENTION

1. Field of the Invention

The present invention relates to network management systems, and more specifically to a method and apparatus for monitoring and reporting the status of a desired group of resource elements.

2. Related Art

Network environments contain several resource elements. A resource element generally refers to an entity that is used in computation or communication. Examples of resource elements include memories, processors, processes, etc.

There is a general need for administrators, users, and other personnel to monitor the health of various resource elements. For example, it may be desirable to know whether a machine has lost connectivity to an underlying network, an interface has dropped packets while forwarding messages, or the number of "open cursors" (in which the database software may need to maintain state information representing the access(es) by a prior query) in a database has exceeded normal limits.

Network management systems are used to monitor various attributes of these resource elements. An attribute generally refers to an entity, the status or other statistic of which can be determined. Examples of attributes include, but are not limited to, operational status of resource elements, utilization of disk space/processor/interface, count of the packets dropped by an interface, the number of open cursors for a database, etc., as is well known in the relevant arts.

In one prior system, thresholds are associated with corresponding attributes of resource elements, and an alarm is generated if the measured value for an attribute exceeds (or falls below) the corresponding threshold. In some systems, the thresholds themselves are dynamically computed and based on historical data. In general, the thresholds are intended to represent normal or desirable behavior in relation to corresponding attributes of the resource element.

One drawback with such a prior system is the need to analyze several alarms to determine the extent of abnormalities in a network environment containing one or more resource elements. Further, alarms are usually lagging indicators which typically indicate the state of a system after a problem has occurred, whereas it may be beneficial to use information about all deviations from normal or desirable behavior (i.e., all abnormal events that may or may not result in alarms) to obtain a leading indicator that may indicate impending problems in the system. Various aspects of the present invention overcome one or more of such disadvantages (or provide one or more of the desired benefit(s)), as described in sections below.

BRIEF DESCRIPTION OF THE DRAWINGS

The present invention will be described with reference to the accompanying drawings, wherein:

FIGS. 5A-5C contain display screens using which an administrator or user can define a group of resource elements in an embodiment.

FIGS. 6A-6D contain display screens using which an administrator or user can create an instance of the Abnormality Index monitor for the previously defined group of resource elements in an embodiment.

FIG. 7B contains a table illustrating the manner in which the number of deviations in an event poll period is translated to a probability used to compute Abnormality Index in an embodiment of the present invention.

FIG. 8A is a table illustrating the manner in which the criticality of a deviation is translated to a rank used to compute Abnormality Index in an embodiment of the present invention.

FIG. 8B contains a table illustrating the manner in which weighted values of probability and abnormality are computed in an embodiment of the present invention.

FIG. 8C is a table illustrating the manner in which rank and severity are normalized in an embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

An aspect of the present invention generates an Abnormality Index for one or more resource elements specified by a user, where this index represents the deviation in operation from corresponding baseline thresholds. In an embodiment, each baseline threshold corresponds to the expected behavior of each resource element based on historical data, and the Abnormality Index is generated as a single number that represents the seriousness, count (of number of deviations), and extent of deviations. Hence, an administrator may conveniently determine the status (health or well-ness) of the specified resource elements.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
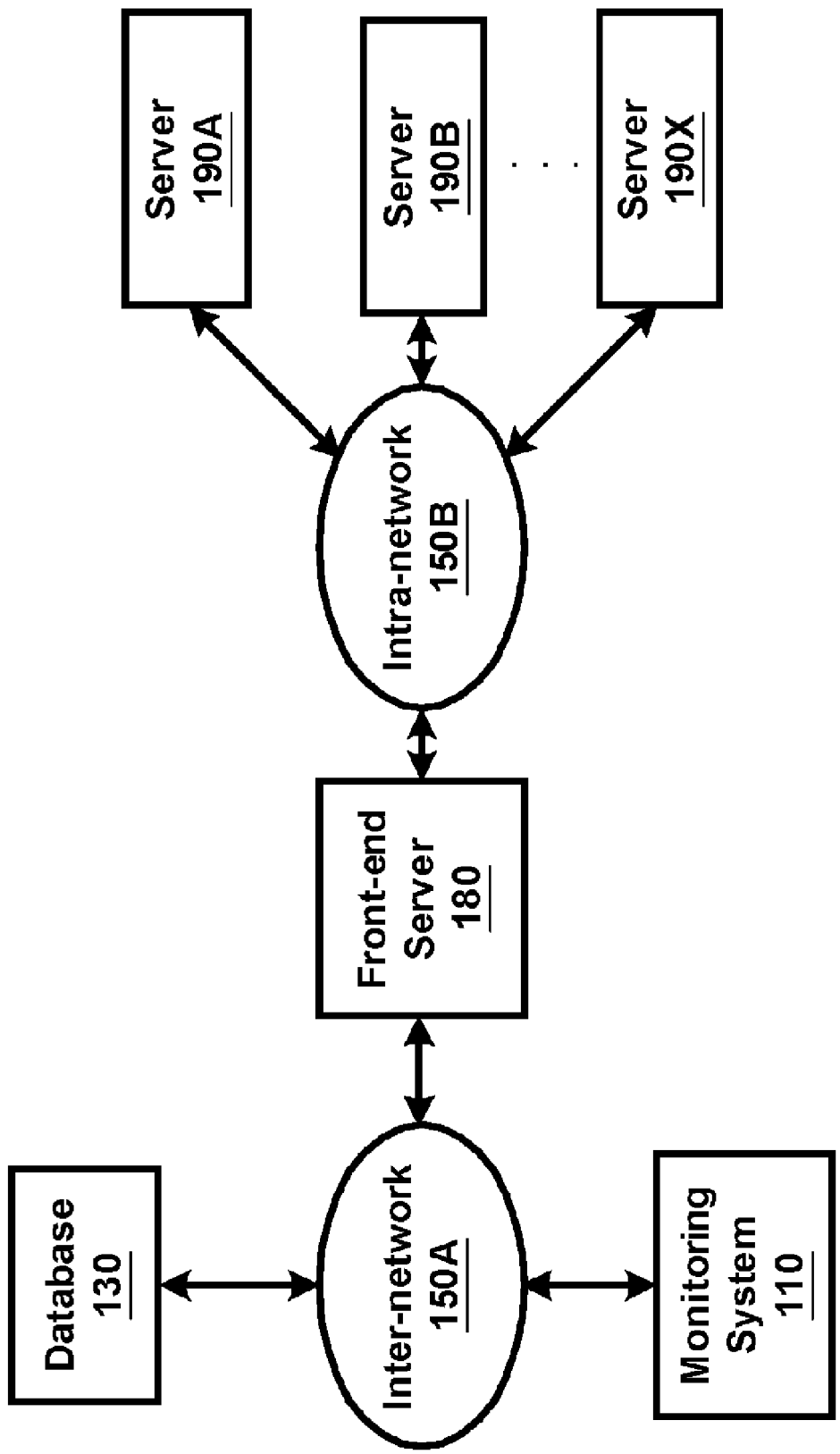
FIG. 1 is a block diagram illustrating an example environment in which various aspects of the present invention can be implemented.

FIG. 1 is a block diagram illustrating an example environment in which various aspects of the present invention can be implemented. The environment is shown containing monitoring system 110, database 130, inter-network 150A, intra-network 150B, front-end server 180, and servers 190-A through 190-X. It should be appreciated that only a few representative systems and components are shown in FIG. 1 for illustration. However, typical environments contain several more (types) systems. Each system of FIG. 1 is described below in further detail.

Servers 190A-190X represent resource elements sought to be monitored according to various aspects of the present invention. All the servers are shown connected to intra-network 150B. Front-end 180 receives various requests from inter-network 150A, and distributes the requests to one of servers 190A-190X, for example, according to a known approach.

For illustration, some of servers 190A-190X are assumed to be "Solaris Servers" (available from Sun Microsystems) and some other servers are assumed to be "Sybase Servers". However, monitoring system 110 allows attributes of any type (e.g., % CPU utilization, # file descriptors used, total memory used) of different systems (e.g., web servers, database servers, NAS servers, network interface) to be monitored together, as described in sections below.

3. Monitoring Resource Elements

Figure 2:
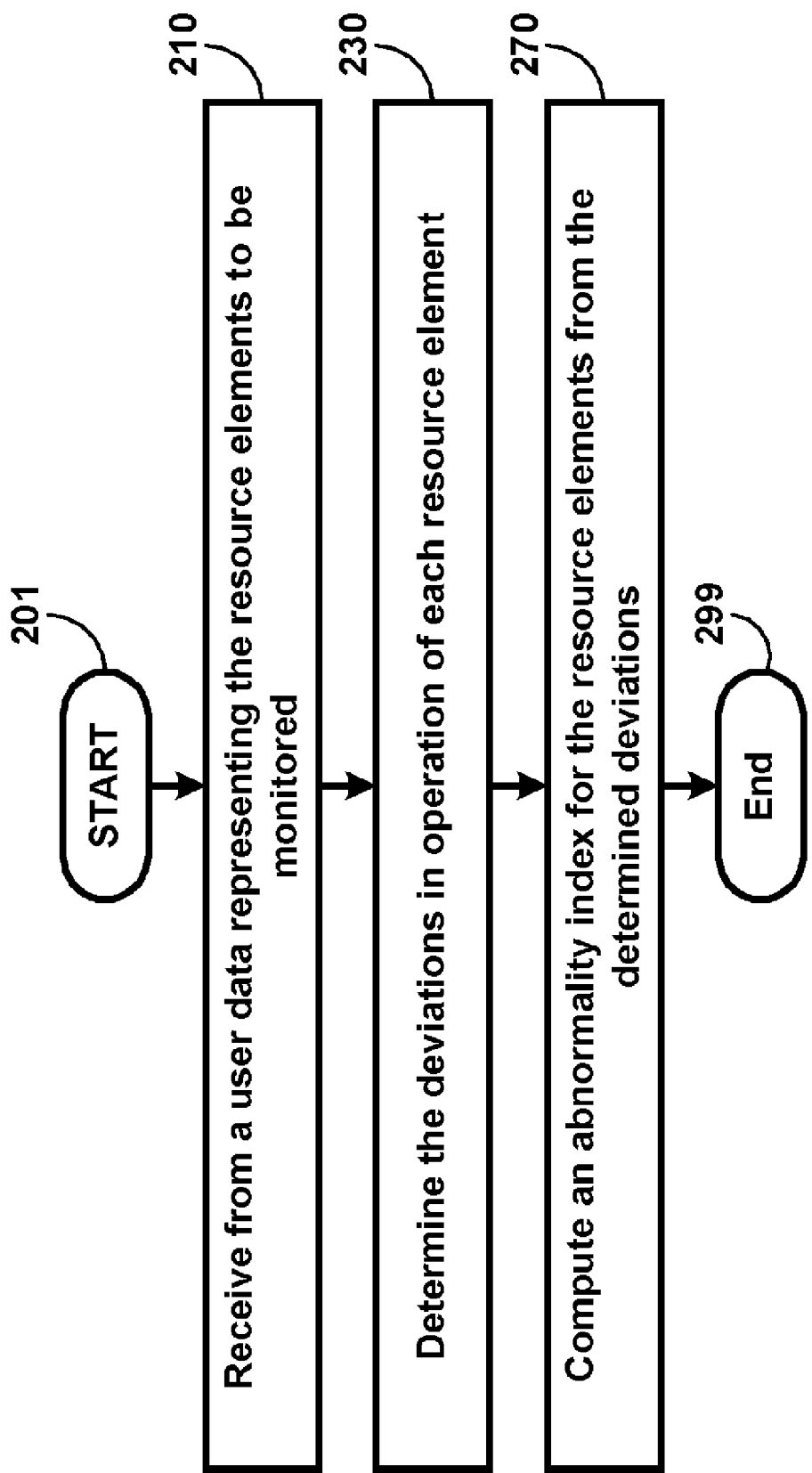
FIG. 2 is a flow chart illustrating the manner in which Abnormality Index for one or more resource elements can be computed according to various aspects of the present invention.

FIG. 2 is a flowchart illustrating the manner in which a monitoring system may enable a user to easily determine the status of a desired group of resource elements according to an aspect of the present invention. The flowchart is described below with respect to FIG. 1 for illustration. However, the features can be implemented in other environments also, as will be apparent to one skilled in the relevant arts by reading the disclosure provided herein. The flowchart begins in step 201, in which control passes to step 210.

In step 210, monitoring system 110 receives data representing resource elements to be monitored for abnormalities. The data may be received according to any suitable user interface. An example approach is described below in further detail.

In step 230, monitoring system 110 determines the instances in which each resource element deviates from a baseline (normal, expected and/or desired) behavior. The attributes characterizing the resource element may be monitored to determine the deviations.

In step 270, monitoring system 110 computes an Abnormality Index for all the resource elements based on the determined deviations. Ideally, the Abnormality Index should identify the degree/extent of health or well-ness of all the resource elements viewed as a single group. Accordingly, various factors such as the number of deviations, duration of deviation, the seriousness of deviation, etc., may be weighed in computing the Abnormality Index as described with examples below. The flowchart ends in step 299.

Due to the computation of an Abnormality Index for a specified group of resource elements in the network environment, an administrator/user may be able to make certain inferences about its degree of health or well-ness. In an embodiment described below, the health of a group of resource elements is considered as good when the reported Abnormality Index is low; as the health deteriorates, the Abnormality Index increases. An Abnormality Index of 0% means that the group of resource elements is behaving normally, where as a value tending towards 100% means that the health of the group is deteriorating. The approach described above can be implemented in various embodiments. An example implementation of monitoring system 110 is described below.

4. Monitoring System

Figure 3:
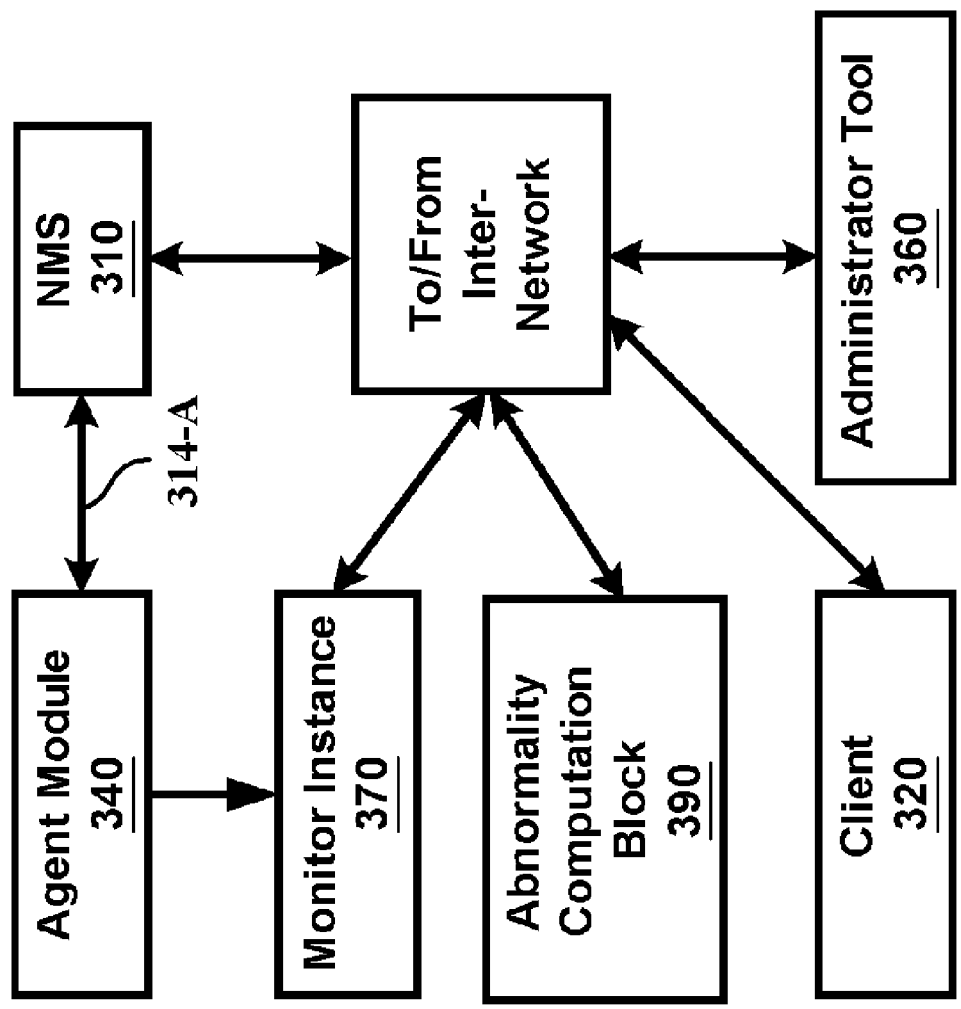
FIG. 3 is a block diagram illustrating the details of a monitoring system in an embodiment of the present invention.

FIG. 3 is a block diagram illustrating the details of monitoring system 110 in one embodiment. Monitoring system 110 is shown containing network management station (NMS) 310, client 320, agent module 340, administrator tool 360, monitor instance 370 and abnormality computation block 390. Each block is described below in further detail.

Only the details of monitoring system 110 (or blocks therein), as believed to be relevant to understanding the implementation of the described embodiment(s), are provided in the present application. For further details of monitoring system 110, the reader is referred to the co-pending applications noted in the related applications section above.

Monitor instance 370 represents an entity (e.g., a process executing on a system) that actively samples the status values of various attributes of interest for a resource element previously specified by the user. The sampled values may be sent via network 150A to database 130. Monitor instance 370 may be instantiated/created by using agent module 340, as described below briefly (and in further detail in the co-pending applications noted above in the related applications section).

NMS 310 operates as a central point at which the operation of other blocks on monitoring system 110 is coordinated. Thus, NMS 310 stores and makes available each monitor type to corresponding agent modules, allocates unique identifiers to each monitor instance, etc. Various monitor types may be pre-specified and the user may specify a resource element (of the same type) associated with the monitor type to cause NMS 310 to interface with agent module 340 to instantiate the monitor instance.

NMS 310 also provides a suitable user interface using which a user specifies the monitor instances (and thus the resource elements) for which the Abnormality Index needs to be computed. The user may further specify parameters that define an abnormality for each attribute of the monitor type/instance.

Agent module 340 facilitates the instantiation of monitor and group instances using the monitor types present in NMS 310, as well as the identifiers of resource elements received from NMS 310. In addition, agent module 340 may facilitate tasks such as changing of control parameters (e.g., polling frequency), forwarding the data points polled for various attributes, etc. To provide the above features, each agent module is provided the ability (compatible network protocol, medium interface, etc.) to communicate with NMS 310.

Abnormality computation block 390 periodically (e.g., at an event interval specified by the user) computes the Abnormality Index from the data polled by the monitor instances, and stores the corresponding values in database 130. The Abnormality Index is computed for the resource elements specified by a user via NMS 310. The manner in which Abnormality Index can be computed is described in further detail in sections below.

Administrator tool 360 is used by an administrator/user to configure and instantiate various monitor instances. Administrator tool 360 may be integrated into NMS 310 as one unit. However, for ease of administration, administration tool may be provided from various client systems (320). The manner in which a user may define monitor types and instantiate new monitor instances according to various aspects of the present invention is described below in further detail.

Client 320 provides a suitable user interface using which users may view the Abnormality Index of various resource elements monitored according to various aspects of the present invention. NMS 310 may provide the corresponding information using a suitable user interface. The description is continued with respect to an architecture view of an example embodiment of NMS 310.

5. Network Management Station (NMS)

Figure 4:
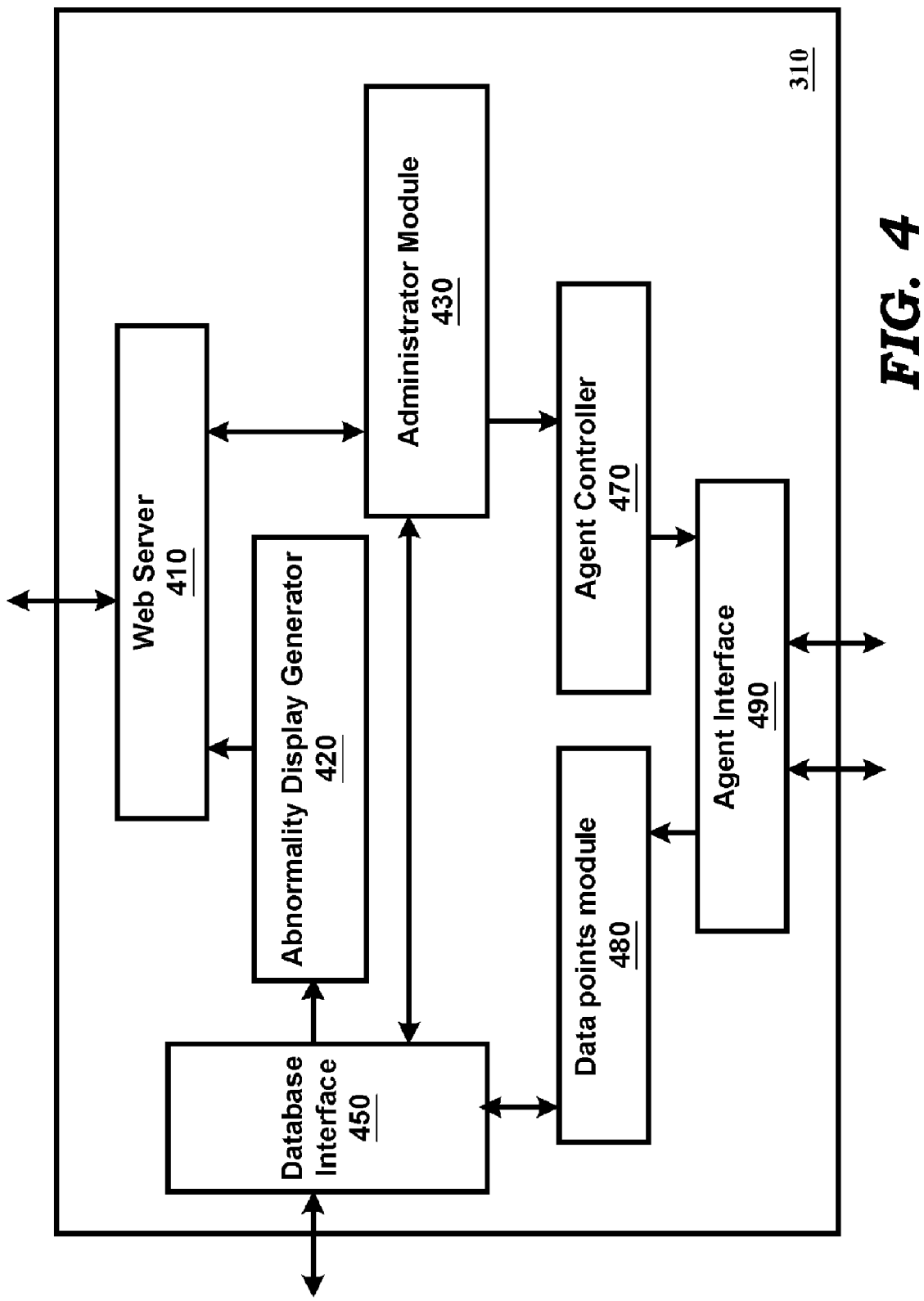
FIG. 4 is a block diagram illustrating the details of a network management station in an embodiment of the present invention.

FIG. 4 is a block diagram illustrating the details of NMS 310 in one embodiment. NMS 310 is shown containing web server 410, abnormality display generator 420, administrator module 430, database interface 450, agent controller 470, data points module 480, and agent interface 490. Each component is described below in further detail.

Web server 410 provides interface to client 320 and administrator tool 360 to interact with other modules in NMS 310. In an embodiment, a request for a web page is received in the form of a URL and associated parameters, and web server 410 communicates with an application server (not shown) to provide the appropriate interface for client 320 and administrator tool 360. The application server may be implemented to contain administrator module 430. Web server 410 and the application server may be implemented using products available in the market-place as will be apparent to one skilled in the relevant arts.

Abnormality display generator 420 retrieves the values for Abnormality Index (pre-computed for a group of resources of interest) from database 130, and interfaces with web server 410 to cause the values to be displayed according to a suitable user interface. Assuming the Abnormality Index is computed for multiple groups of resource elements of interest specified by potentially different administrators, abnormality display generator 420 receives the identifier of the specific group, retrieves the corresponding indexes from database 130, and causes the indexes to be displayed by a suitable user interface.

Administrator module 430 provides appropriate interface for administrator tool 360 to enable an administrator to define, configure and instantiate monitor instances, in addition to specifying the specific monitor instances for which the Abnormality Index is to be computed. Administrator module 430 configures database 130 to enable storing of any monitor types/instances, as well as to generate/store the Abnormality Index computed at different time instances.

Data points module 480 receives various sampled values related to attributes (of individual monitored elements) being monitored by the corresponding monitor instances, and determines the manner in which the data points need to be processed. At least some of the data points may be stored in database 130 by communicating with database interface 450. The number of data points stored may be reduced and/or alarms logged, for example, as described in U.S. Pat. No. 6,453,346 issued to Garg et al, which is incorporated in its entirety into the present application.

Agent controller 470 operates under the control of administrator tool 360 (via administrator module 430) to instantiate various monitor instances, and to provide the appropriate configuration parameters. In general, each monitor instance may be provided information indicating the specific attributes to be monitored, polling frequency, timeout value for each poll, etc., in addition to the program logic enabling the monitor instance to poll the device for the data point. Agent interface 490 enables communication with each of the monitor instances according to the specific medium/protocol using which the monitor instance can be contacted.

The description is continued with reference to the manner in which several aspects of the present invention may be implemented in the embodiment(s) described above. In particular, the description is continued with respect to the manner in which a user may specify the resource elements of interest, for which Abnormality Index is to be computed.

6. Specifying Resource Elements of Interest

In one embodiment described in further detail in the applications noted in the related applications section above, a monitor instance is created associated with a corresponding resource element. The monitor instance indicates the specific attributes of interest, polling periods, timeouts, etc., to be used in the monitoring operations. The corresponding monitor instance may log the data into database 130 (via data points module 480). An embodiment of the present invention uses such monitor instances to specify the resource elements of interest, as described below with reference to FIGS. 5A-5C.

Figure 5A:
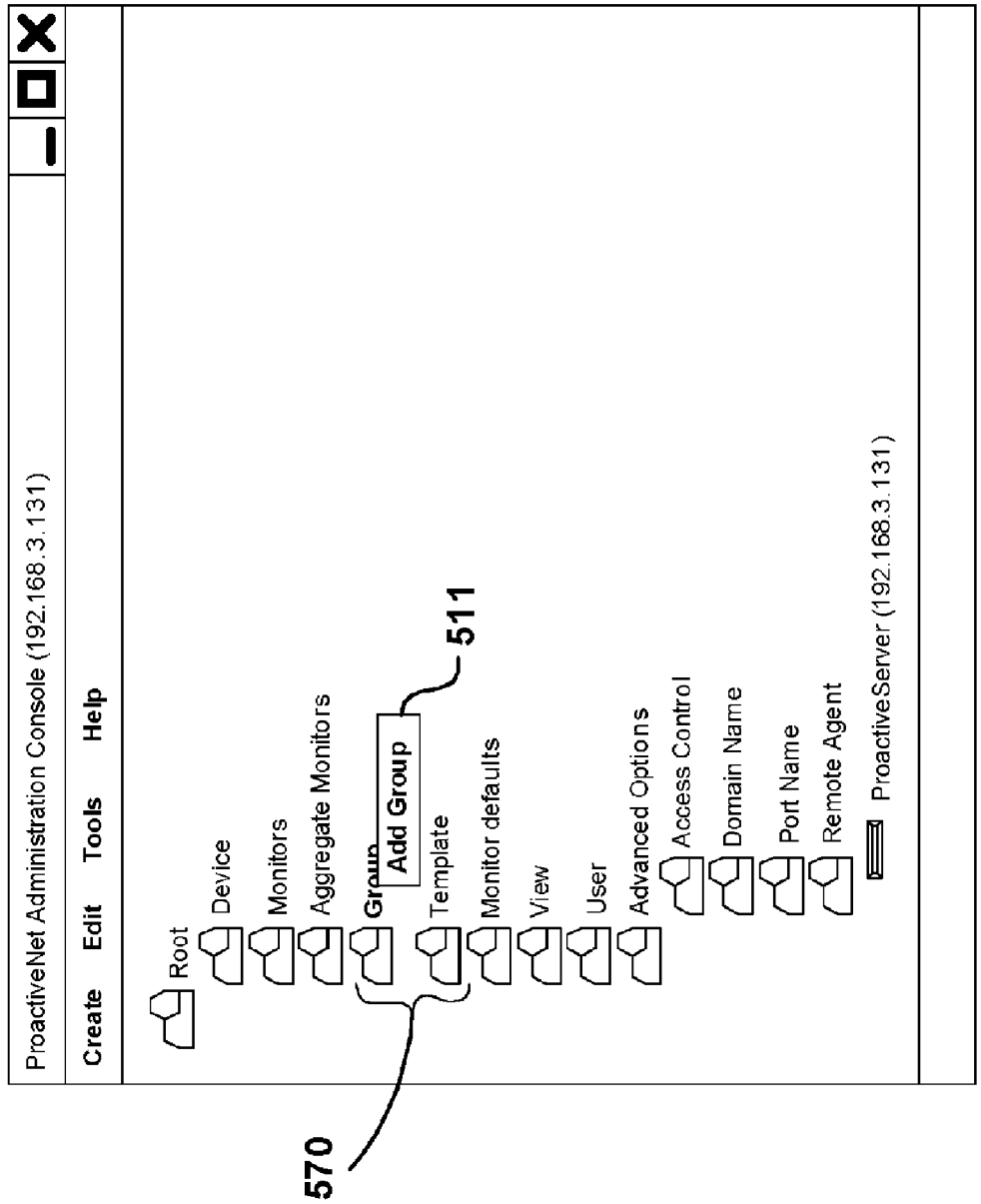
Figure 5B:
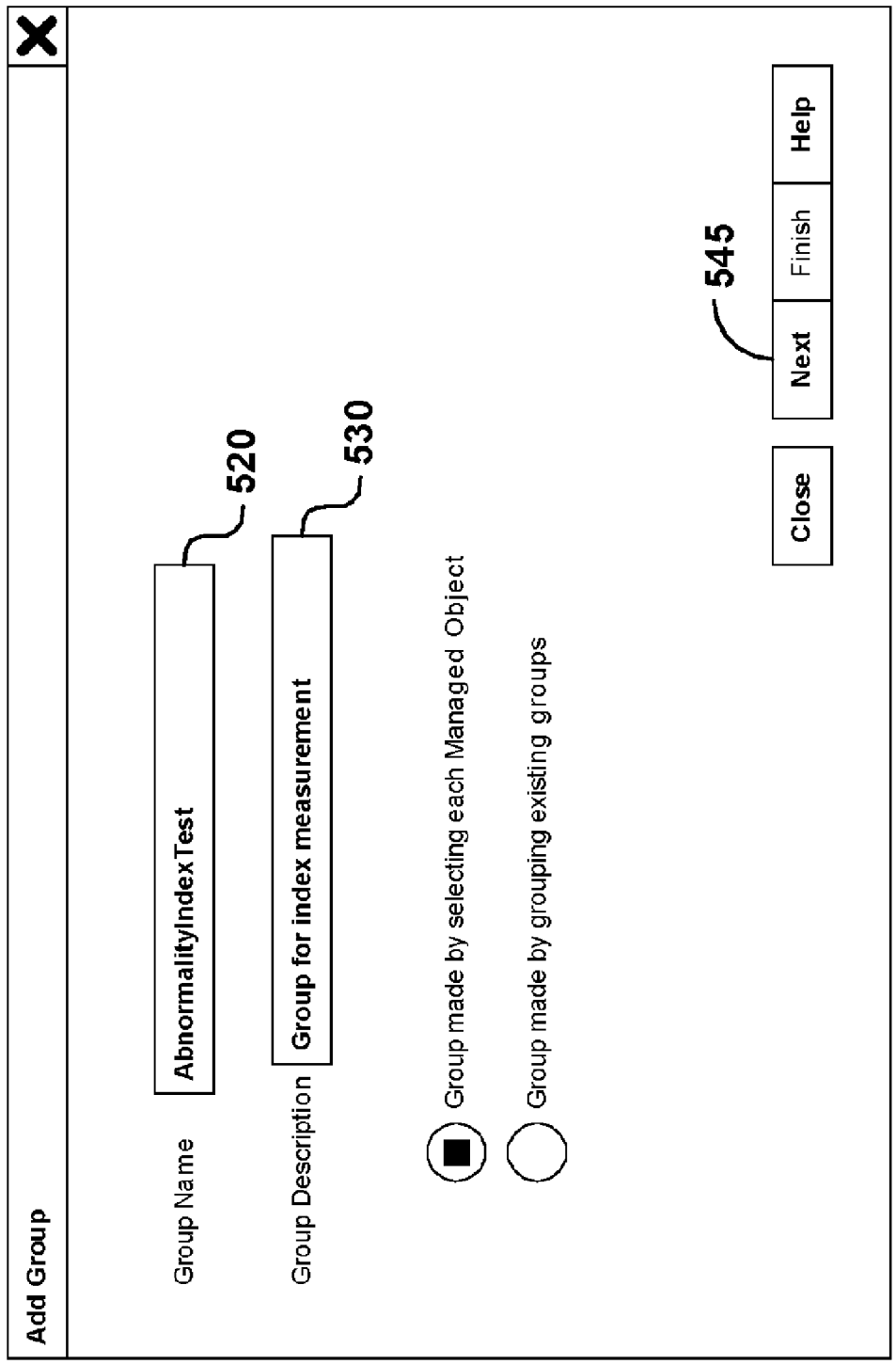

FIGS. 5A-5C contain display screens illustrating the manner in which a user may specify monitor instances, and thus the resource elements of interest as a group type. The group type can then be used to instantiate various group instances as described later with reference to FIGS. 6A-6D. FIGS. 5A-5C are first described briefly below.

On selecting 'Add Group' control 511 of FIG. 5A, the administrator/user creating a group type (which includes one or more monitor instances) is provided with the display screen of FIG. 5B. Input values in entries 520 and 530 respectively indicate the name of the group and the corresponding description as 'AbnormalityIndexTest' and 'Group for Index measurement'. Control is then transferred to the display screen of FIG. 5C when the user selects next button 545.

FIG. 5C depicts the monitor instances (and thus the resource elements and attributes) selected. Portion 540 depicts the various monitor instances defined earlier, from which the user can select the desired instances. Upon selection, the entries are displayed in portion 550 and 560 of FIG. 5C. The administrator is assumed to have selected the three resource elements indicated by rows 552, 553 and 554 with the values 'Solaris Process', 'Solaris Process' and 'Sybase ASA Intelliscope' in column 550. Column 560 contains pathnames for the monitors, which indicates the hostname of the server (e.g., 190-A) to which the resource element belongs. For example, row 552 indicates that a Solaris process named 'dbsrv' running on a server named 'Lokpavani' is a member of the group of resource elements to be monitored.

Thus, using the approaches of FIGS. 5A-5C, a user may specify the resource elements of interest to define a group type. The group type can then be used to instantiate various group instances as described below with respect to FIGS. 6A-6D.

Figure 6A:
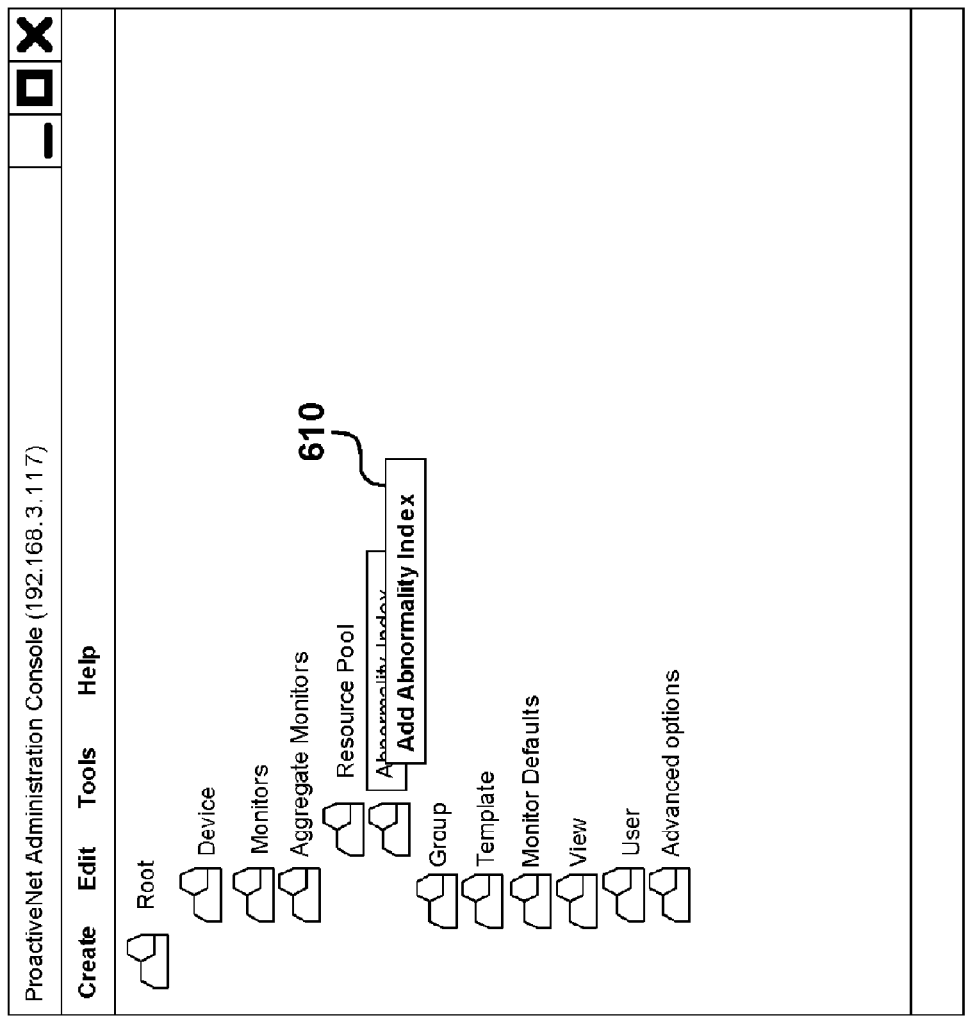
Figure 6B:
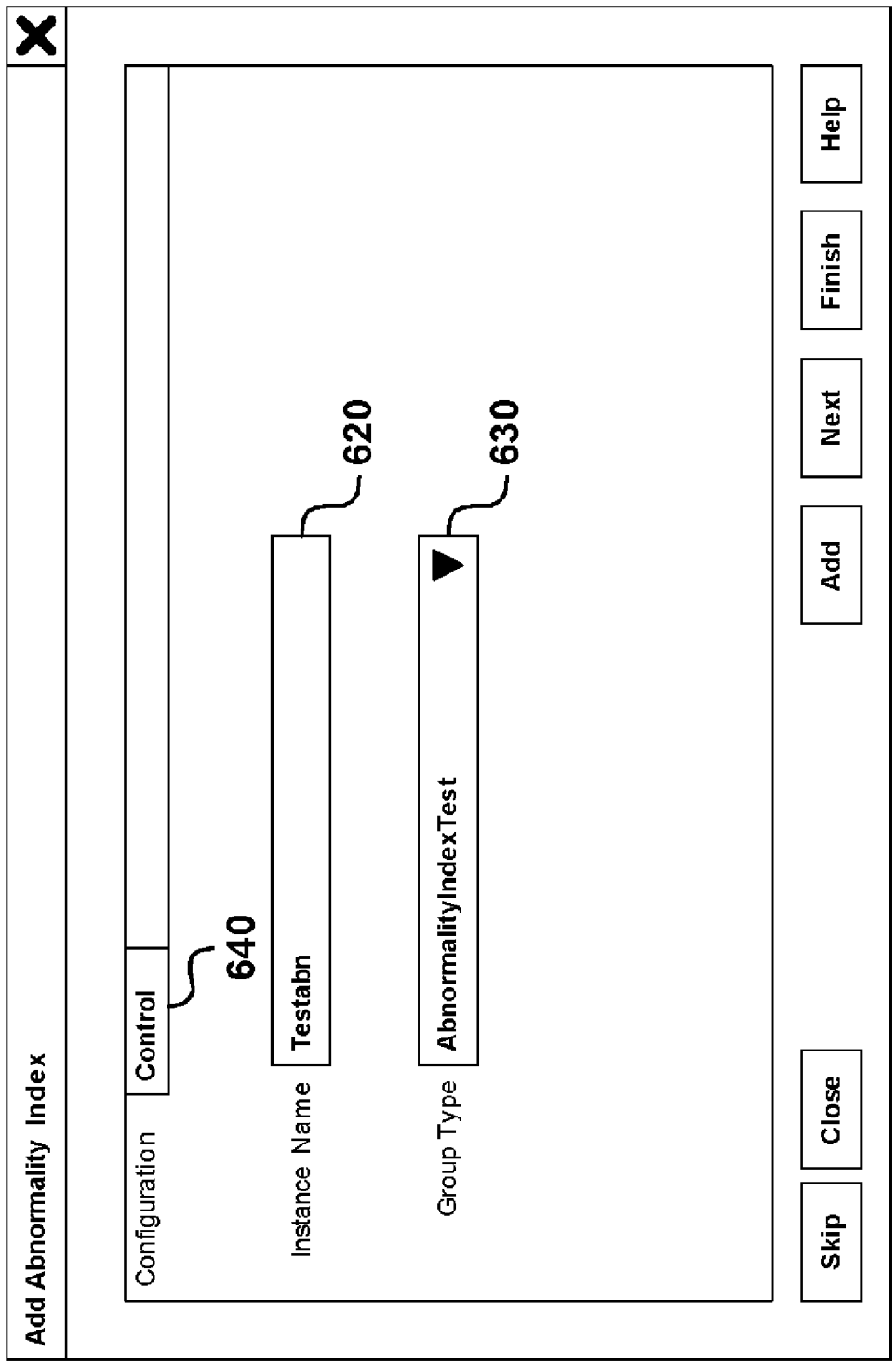

FIG. 6A contains a display screen illustrating the manner in which a user may instantiate a group instance from a group type defined earlier. As shown, an administrator uses the 'Add Abnormality Index' option (indicated by 610) to start defining a group instance. In FIG. 6B, the administrator is shown assigning a name 'Testabn' (Entry 620) for this instance, belonging to the group type 'AbnormalityIndexTest' (selected using list box 630). Note that the group type 'AbnormalityIndexTest' was previously defined in FIG. 5B.

In FIG. 6C, the administrator is shown assigning control parameters for the instance 'Testabn' defined in FIG. 6B. The control parameters may be set at their default values, or changed depending on the administrator's need, and are used to control the behavior of the monitor instance during the data collection process. For example, 'Event Poll Interval' (entry 660) specifies the polling interval (and thus frequency of data collection), and 'Event Poll Timeout' (entry 670) specifies the duration of time after which a poll request is deemed to time out upon the absence of response for the poll request.

Figure 6D:
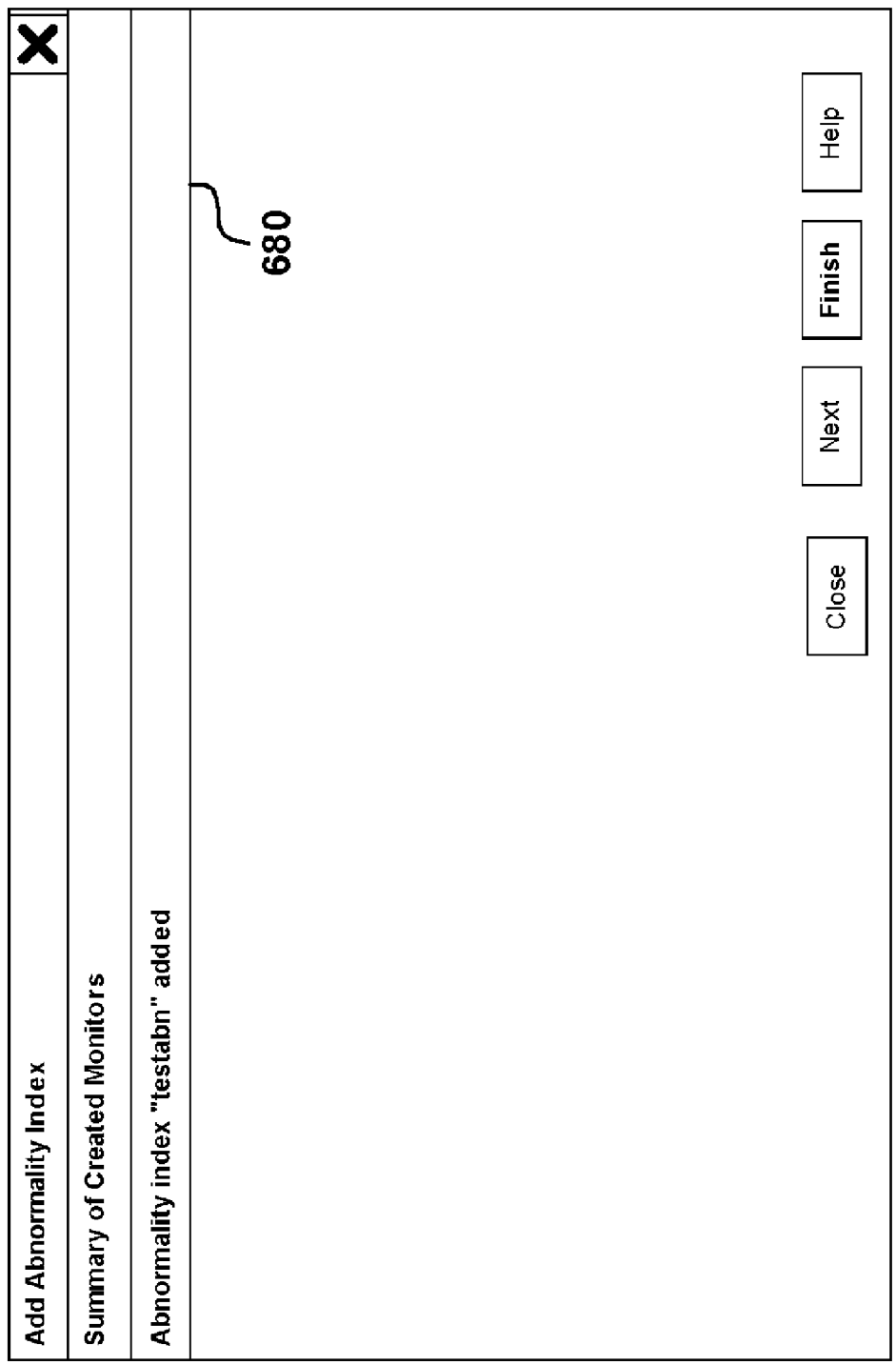

Successful creation of the group instance (upon selection of Finish button of FIG. 6C) is verified based on the display screen of FIG. 6D (as indicated by line 680). It should be appreciated that NMS 310 stores various types of information as the group type and group instance are being defined, as described below.

7. Storing Information on Selected Resource Elements

In one embodiment, NMS 310 generates a unique identifier (key) for each group instance, and stores the corresponding information (identifier, name, description, etc.) in a corresponding table within database 130. Another table within database 130 contains information identifying the monitor instances in the group (consistent with the selections of FIG. 5C).

As noted above, each monitor instance specifies the attributes to be monitored for a corresponding resource element. Additional data may be stored to represent the attributes (and corresponding properties) for each property of the attribute. Such additional data generally contains a unique identifier of the attribute (used to correlate polling results, data stored in database 130, etc.), unique name (in human readable form), a display name (displayed in user interface), attribute type, units of measurement for this attribute, database and tables names where the values for this attribute are to be stored.

Thus, it should be appreciated that a user may select only attributes of interest while selecting the monitor type/instance for the resource element(s). In addition, it should be appreciated that monitor instance 370 polls the corresponding resource element(s). The polled values are used to determine deviations and the Abnormality Index. The administrator/user may configure a desired value of the polling interval for each monitor instance, but this is usually set to a small value (e.g., 1-5 minutes) in order to increase the number of data points in a sample, as explained later.

The polled values are then used (by abnormality computation block 390) to first determine the deviations as described below.

8. Determining Deviations

As may be appreciated, a resource element may be viewed as deviating from normal behavior if polled values deviate from corresponding thresholds (generally, included in baseline thresholds). The threshold values can be static (fixed) or dynamic (computed "on the fly", for example, based on prior values). The deviation based on a single poll may be used to generate an "alarm" and all the alarms may be construed as deviations (for the purpose of computing Abnormality Index) in one embodiment.

In an alternative embodiment, other measures of deviations are employed in computing the Abnormality Index in which abnormal events (representing deviations from normal behavior, as determined from historical data) are considered. Alarms are not considered (in this embodiment) in computing the Abnormality Index since these are typically lagging indicators that identify the state of a system after a problem has occurred. Rather, it may be more beneficial to use information about all deviations in the system (i.e., abnormal events which may or may not develop into conditions that eventually give rise to alarms) to obtain a leading indicator that potentially helps identify impending problems in the system.

One such embodiment is based on the description of U.S. Pat. No. 6,327,677 entitled, "Method and apparatus for monitoring a network environment" and U.S. Pat. No. 6,453,346 entitled, "Method and apparatus for intelligent storage and reduction of network information", both issued to Garg et. al., using which a separate baseline curve is computed on an hourly, daily and weekly basis for each attribute based on historical data.

Baseline is an estimate of the expected (or normal operating) range of values for a monitor's attribute(s). The values for any attribute can vary over time. Two values are stored for the baseline of each attribute: (a) Low Threshold—The lower end of the expected range, and (b) High Threshold—The higher end of the expected range. The low threshold is approximately the $10^{th}$ percentile of all values for the given time period, while the high threshold is approximately the $90^{th}$ percentile of all values in that same time period.

Baseline ranges are calculated from RATE data (condensed representation of the RAW or polled data). Baseline range is calculated from RATE's $90^{th}$ percentile and $10^{th}$ percentile values, taking a weighted average of these values over time (with higher weightage being given to the latest data). That is, baseline is similar to a moving average; however, it is based on the $90^{th}$ percentile and $10^{th}$ percentile of all values of the RATE data.

To track the anomalies in behavior of different attributes, different patterns are required. For example, for attributes that change frequently, a pattern captured at hourly intervals may be better suited. Hourly interval ranges represent a smaller number of data points and hence will tend to have a tighter range, thus capturing the more frequent changes. Hence, three kinds of baseline patterns are captured to determine the deviations from normal behavior:

Hourly baseline—A high/low value of each attribute is derived from the moving average of each consecutive hour. However, weekday hours and weekend hours may be treated separately—this means that the behavior from Monday-to-Friday will be in one set of 24-hour brackets, where as the behavior from Saturday-to-Sunday will be in a different set.

Daily baseline—A high/low value of each attribute is derived from the moving average of each consecutive day. This high/low range is taken from a larger number of data values and consequently will have a wider range than the hourly pattern.

Weekly baseline—A high/low value of each attribute is derived from the moving average of each consecutive week. This high/low range is taken from a much larger number of data values and consequently will have a significantly wider range than the hourly or daily patterns.

Baseline calculations begin after the first 24 hours of (RAW) data collection. The first 24 hour period for baseline uses a special algorithm. At the end of the first 24 hour period, the $90^{th}$ percentile and $10^{th}$ percentile values for that first day are set for that 24 hour period. Following this initial 24 hour setting, each hour is calculated by factoring in a weighting of the old baseline value for that hour and the current RATE value for that hour. Generally, the accuracy of baseline improves with time. These baseline patterns are used to categorize the abnormalities generated (with hourly being least severe, and weekly being most severe).

Abnormalities are generated when the values polled by a monitor instance (of a particular monitor type, for a resource element of interest) falls outside of the normal baseline range for a statistically significant number of points within a specified sample window (specified in the screen of FIG. 6C). The abnormalities generated have a "severity" field, which records which baseline was exceeded for a significant number of points (helping determine the severity of the abnormality). Generally, abnormalities that exceed Weekly baseline are more serious in nature than ones that exceed Daily baseline, and abnormalities that exceed Daily baseline are more serious in nature than ones that exceed Hourly baseline.

By default, abnormalities are generated using a sample window of 30 minutes and deviation of 5%. A minimum of 5 data points is required. If the sample window is too small, the algorithm automatically waits for at least 5 data points to be available. For example, if the polling rate of a monitor is 5 minutes, then it will have to wait 25 minutes (to collect 5 data points, with each data point arriving approximately 5 minutes apart) before an abnormality may be generated. Hence, it is generally better to use a smaller polling interval (i.e., higher polling rate or frequency) for the monitors being used to collect the data for the individual attributes.

Abnormalities are closed when the number of data points exceeded in the last window sample size is not considered significant. For example, if it is determined that 6 out of 7 data points being out of range is statistically significant, then as soon as the last exceeded points drop to 5 out of 7 data points, the abnormality will be closed.

As explained earlier, a deviation is determined for each polled value (for an attribute) in comparison with the three baseline curves (or threshold value at the corresponding time instance) for the attribute. At most only one deviation is considered for each polled instance (for an attribute), with the deviation with respect to weekly baseline overriding the deviation for daily baseline, which in turn overrides the hourly baseline. In other words, only one of the deviations is viewed as an abnormal event even if multiple baselines are violated by a polled value.

Further, there are generally multiple polls for each attribute within an event interval (defined with periods/durations equaling event interval of field 660). The polls in an event interval are considered only if the deviation exists at the end of the event interval. However, the event log (in database 130) is maintained to reflect the duration of deviation within the event interval and the specific baseline violated, as described below in further detail.

9. Deviation Data

Figure 7A:
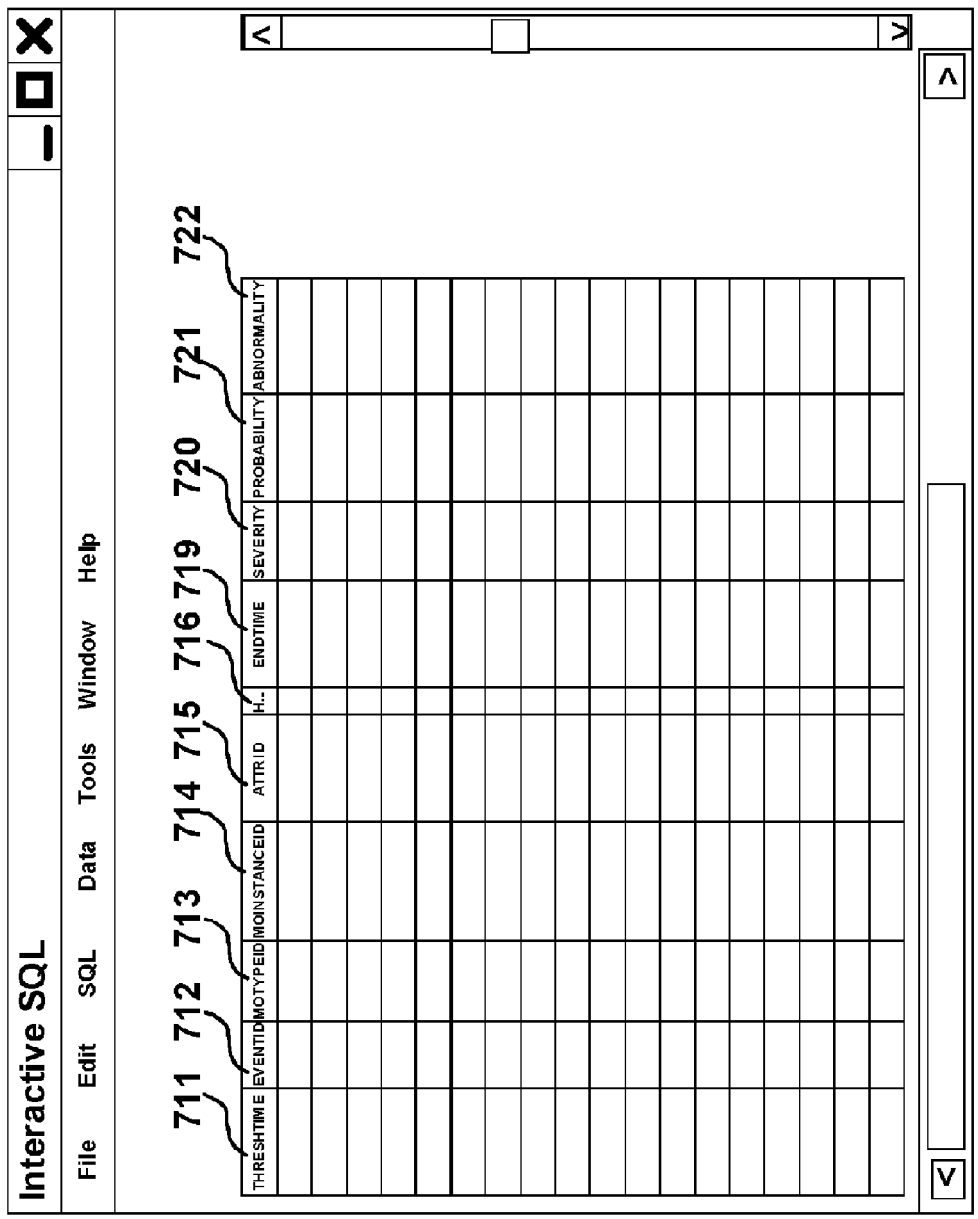
FIG. 7A is a display screen representing deviation data stored in an embodiment of a data storage.

FIG. 7A contains a table schema from database 130 illustrating the data stored to represent deviations (termed as events log, with each event being represented by a row) in an embodiment of the present invention. The table is shown containing multiple columns and each column is described in detail below:

THRESHTIME (711): Contains the time instant (in seconds, Unix system time format) at which the deviation is detected to have started EVENTID (712): Contains a value to uniquely identify the deviation MOTYPEID (713): Identifies the monitor type (in the group comprised of one or more resource elements) for which the deviation occurred MOINSTANCEID (714): Identifies the monitor instance (of the monitor type) which reported the deviation ATTRID (715): Identifies the attribute (of the monitor instance) for which this event is generated THRESHTYPE (717): Identifies the type of deviation (e.g., a value of 157 indicates a baseline event)

ENDTIME (719): Indicates the time instant (in seconds, Unix system time format) at which the event was closed. The maximum value (4,294,967,295) indicates that the event is currently active (i.e., deviation continues to occur at the sampling point corresponding to the poll interval for the attribute). A smaller value (<4,294,967,295) indicates the time at which the event was closed.

PROBABILITY (721): Measure of how many data points in a sample are counted as abnormal events, based on the number of values above (or below) the baseline range. The Poisson probability distribution is used to filter out random violations from true abnormal events, as illustrated with reference to FIG. 7B. If the number of violations is small enough (when comparing sample size 731 with number of violations 732 in each corresponding row) not to be random, then they are counted as true abnormal events. Specifically, if the Poisson value (σ, sigma 733)) is smaller than 0.001, then it qualifies as an abnormal event. PROBABILITY (734) takes values of 0 (rows 761-764 of FIG. 7B), 1 (row 765), 2 (row 766), and 3 (row 767) as illustrated with reference to the table of FIG. 7B, where 0.001≦ZERO SIGMA, 0.0001≦ONE SIGMA<0.001, 0.00001≦TWO SIGMA<0.0001, and THREE SIGMA<0.00001.

The Poisson value (σ) is calculated using the formula $((u^{**}r^*e^{**}(-u))/r!)$, where u=population mean (=n*ρ, where n=population, ρ=probability of violation), r=number of violations, e is the natural number (=2.718), ** is the exponential operation, * is the multiplication operation, / is the division operation, and ! is the factorial operation.

Note that for computation of the Abnormality Index, these values are translated to weighted values of 3, 6, and 10 for PROBABILITY values in the 0-1, 1-2, and 2-3 ranges respectively. The description is continued with reference to FIG. 7A ABNORMALITY (722): Represents the extent to which data points have deviated from the hourly, daily, or weekly baseline. This takes values in the range 1-100 for hourly baseline violations, 101-200 for daily baseline violations, and 201-1000 for weekly baseline violations. The abnormality value is the percent deviation of the average value of all abnormal data points above the corresponding baseline, and is illustrated with the following example:

Weekly baseline data: 0.0, 13.389, 16.894 (Min, Avg, Max)

In a given sample size of 7, 6 data points are above weekly baseline max value of 16.894

In this sample, the average of all abnormal data points (i.e., above baseline) is 23.909

Hence, ABNORMALITY=201+((23.909−16.894)/16.894)*100=242

Note that for computation of the Abnormality Index, these values are translated to weighted values of 5, 10 and 15 for the hourly, daily, and weekly baseline ranges respectively. It should be appreciated that a row based on higher weighted values replaces a row for a lower weighted value, and thus only one row can be present for a given attribute of a resource element at any given time.

SEVERITY (720): Reflects both the PROBABILITY and ABNORMALITY values and is computed by adding the weighted PROBABILITY and weighted ABNORMALITY, and normalizing (dividing by the sum of maximum weighted values of PROBABILITY (i.e., 10) and ABNORMALITY (i.e., 15)) the result of this addition. For example, if weighted PROBABILITY equals 6 and weighted ABNORMALITY equals 15, then SEVERITY equals ((6+15)/(10+15))=0.84.

Abnormality computation block 390 may compute the values in the table based on the poll data stored in database 130 by the corresponding monitor instance. The table of FIG. 7A may be generated off-line in parallel with the polling operations.

Based on the data in database, abnormality computation block 390 may compute the Abnormality Index as described below in further detail.

10. Computing Abnormality Index

In an embodiment, only the rows having active events (with ENDTIME of 4,294,967,295) are considered in computing the Abnormality Index. In other words, such an approach may be used to ignore at least some of the transient abnormalities. Abnormality Index is computed according to the following equation from the active events:

Abnormality Index =

$$\left(\left(\sum_{i=1}^{N}(0.5*NormalizedSeverity_i)+(0.5*NormalizedRank_i)\right)*100\right)\Big/N$$

where * is the multiplication operation, the division operation, $\Sigma$ the summation (addition) operation, the aggregate number of attributes from all the monitor instances in a group of resource elements for which the Abnormality Index is sought to be computed, 'NormalizedSeverity' is as defined in Column 720 above for the corresponding attribute, and 'NormalizedRank'=(Rank of the attribute/Maximum possible value for the rank), where rank for an attribute equals a value of 5, 3, or 1 depending on whether the attribute relates to availability, performance, or other operational status of the resource element respectively.

For example, if an attribute has binary value 0 or 1 to indicate the availability status of a resource element (and the polled value indicates that there is an abnormality (or event active)), the rank value is equal to 5. Since maximum possible value for the rank is also equal to 5, the NormalizedRank value is equal to 1.

It should be appreciated from the above equation that a user can include any desired attributes of any resource element of interest in the computation of Abnormality Index (by appropriate definition of a group comprised of one or more monitor instances in the above described embodiments). The example of FIGS. 8A-8C below illustrates the computation of Abnormality Index:

With respect to FIG. 8A, a group G is shown containing 4 monitor instances M(1)-M(4), each instance belonging to a different monitor type, with each monitor having 2 attributes where the first attribute A(1) relates to availability (rank=5), and the second attribute A(2) relates to performance (rank=3) or other operational status (rank=1). For illustration, it is also assumed that 3 abnormal events are detected as follows:

$1^{st}$ event on A(1) of M(2) (with PROBABILITY=1, ABNORMALITY=50)

$2^{nd}$ event on A(2) of M(2) (with PROBABILITY=1, ABNORMALITY=201)

$3^{rd}$ event on A(2) of M(4) (with PROBABILITY=3, ABNORMALITY=150)

By using the mapping ranges described earlier, these values of PROBABILITY (Columns 842 and 843) and ABNORMALITY (844 and 845) are translated to their respective weighted values as shown in the table of FIG. 8B (blanks in the entries equal 0). The NormalizedRank and NormalizedSeverity values are next computed as shown in the table of FIG. 8C.

The aggregate number of attributes for all monitor instances in the group=(i.e., 4 monitor instances, each having 2 attributes). Hence, Abnormality Index (AI) is computed by summation of NormalizedSeverity and NormalizedRank values (where each is weighted equally as 0.5) for every attribute-monitor instance in the group. It should be appreciated that attributes which do not have abnormal events will have values equal to 0 for NormalizedSeverity and NormalizedRank in this computation:

$$AI = (0+0+(0.5*1+0.5*0.32)+(0.5*0.6+0.5*0.72)+$$
$$0+0+0+(0.5*0.2+0.5*.8))*100/8$$
$$= (0.66+0.66+0.5)*100/8$$
$$= 22.75\%$$

Note that the Abnormality Index would be in the range of 0 to 100. A low value of Abnormality Index indicates that the resource elements in the group are 'healthy', and thus a 'Health Index' may alternately be represented as equaling (100-Abnormality Index). A high value of 'Health Index' indicates that there is no abnormal behavior, and all resource elements are operating as expected. The Abnormality Index or health may be displayed using a suitable interface as described below with examples.

11. Displaying Abnormality Index Values

Figure 9A:
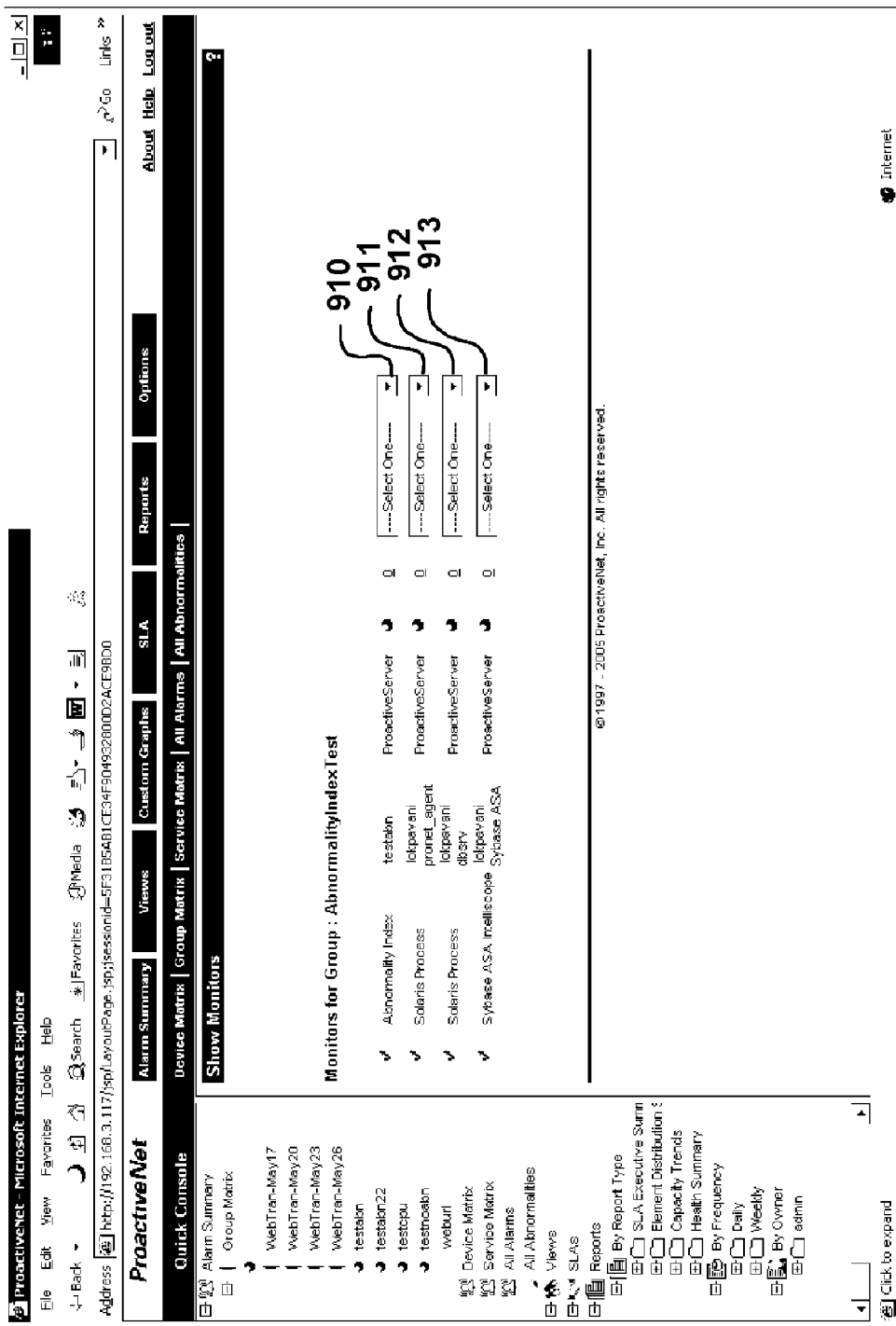
FIGS. 9A and 9B indicate the manner in which a network monitoring system can be used to display values of Abnormality Index for a group of resource elements in an embodiment of the present invention.

FIG. 9A illustrates the manner in which a user may view all the group instances presently being monitored. The user may access NMS 310 from client 320 to view the display screen of FIG. 9A. The user may select the previous defined group instance "Testabn" to view the various values computed for the Abnormality Index. The graph (with time on X-axis) of FIG. 9B is displayed in response.

Figure 9B:
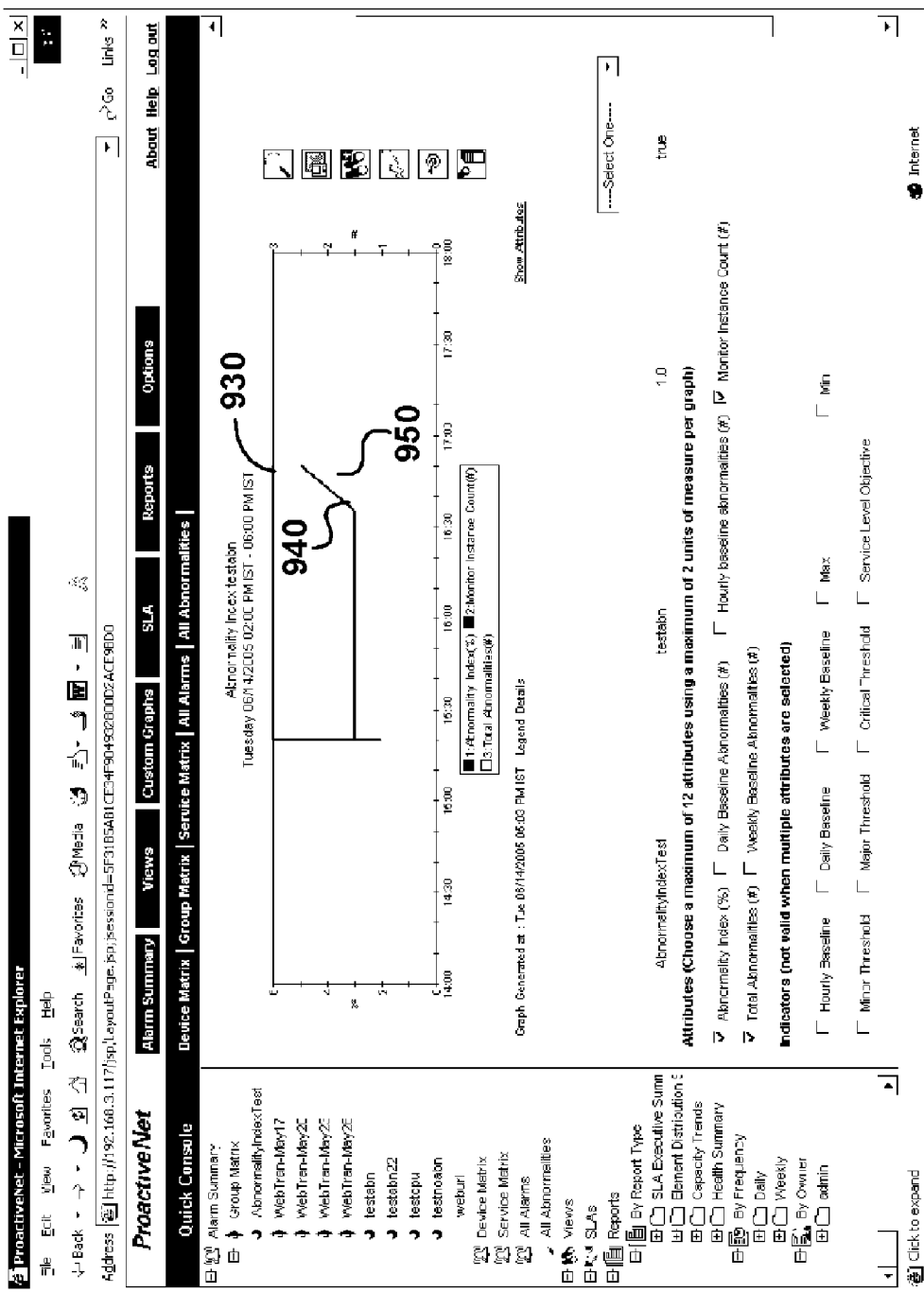

Curve 930 of FIG. 9B represents the values computed for the Abnormality Index at different time instances, curve 940 represents the total number of abnormalities (active events) for all attributes of all monitor instances in the specified group, and curve 950 represents the number of monitor instances in the specified group. As may be appreciated from the Equation above, some of the attributes may have event closed and some other attributes may not have prior deviations, thereby not contributing to the Abnormality Index. An administrator may find it convenient to know not only the Abnormality Index value for a group, but also the count of abnormalities and number of monitor instances in the same group.

The features of various alternative embodiments described above can be combined in a desired manner to implement additional embodiments as suited for specific environments and/or as desired by a designer. It should also be understood that the different components of the network management system can be implemented in a combination of one or more of hardware, software and firmware.

In general, when throughput performance is of primary consideration, the implementation is performed more in hardware (e.g., in the form of an application specific integrated circuit). When flexibility and/or cost are of primary considerations, the implementation is performed more in software (e.g., using a processor executing instructions provided in software/firmware). Cost and performance can be balanced by implementing with a desired mix of hardware, software and/or firmware. An embodiment implemented substantially in software is described below.

12. Software Implementation

Figure 10:
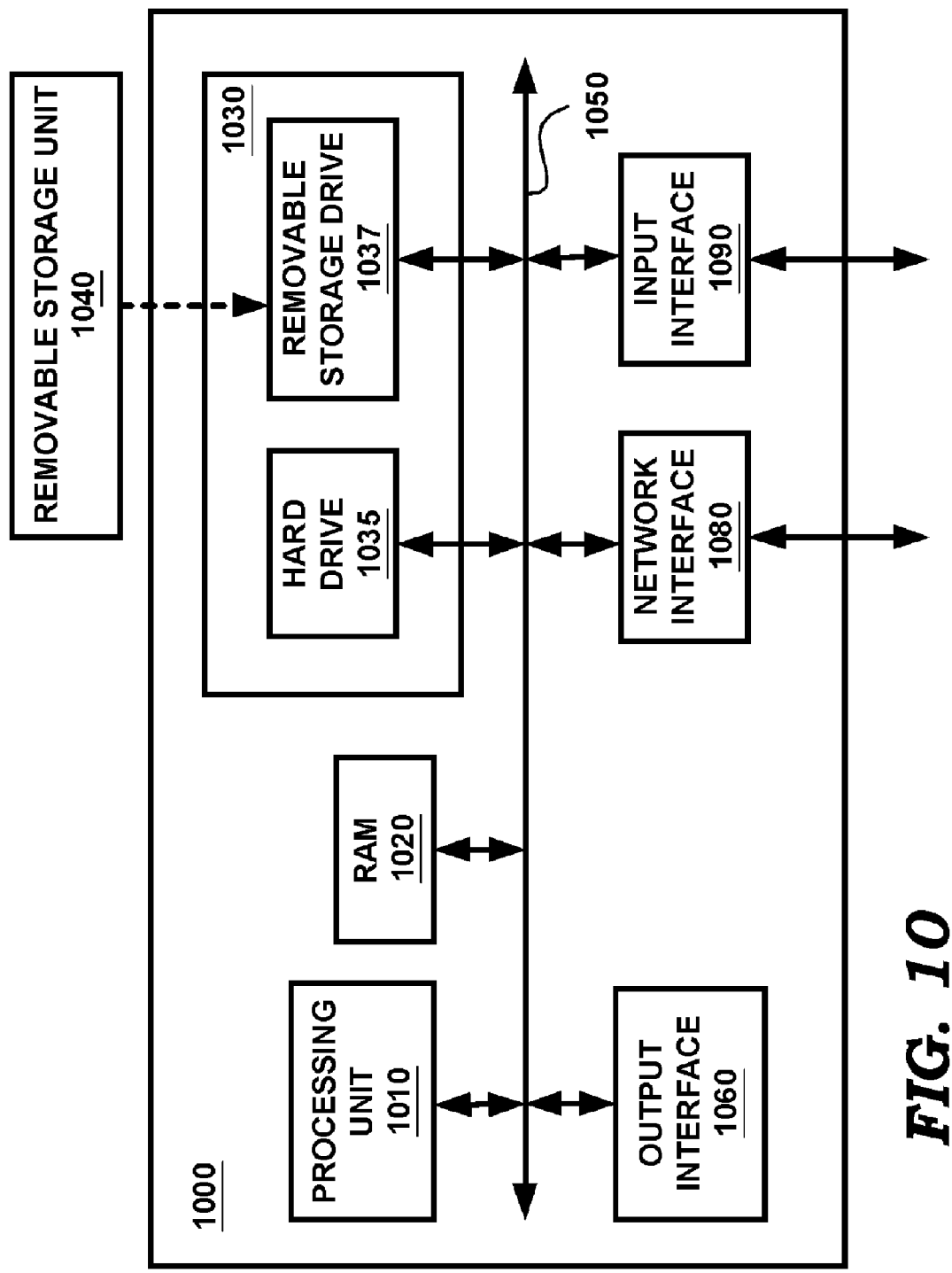
FIG. 10 is a block diagram of a computer system illustrating an example system in which various aspects of the present invention can be implemented.

FIG. 10 is a block diagram illustrating the details of system 1000 in one embodiment. System 1000 may correspond to a portion of monitoring system 110. System 1000 is shown containing processing unit 1010, random access memory (RAM) 1020, secondary memory 1030, output interface 1060, network interface 1080 and input interface 1090. Each component is described in further detail below.

Input interface 1090 (e.g., interface with a key-board and/or mouse, not shown) enables a user/administrator to provide any necessary inputs to system 1000. Output interface 1060 provides output signals (e.g., display signals to a display unit, not shown), and the two interfaces together can form the basis for a suitable user interface for an administrator to interact with system 1000. For example, an administrator may specify the resource elements (and corresponding attributes) of interest and view the values corresponding to Abnormality Index for the specified elements using the interfaces.

Network interface 1080 may enable system 1000 to send/receive data packets to/from other systems on corresponding paths using protocols such as internet protocol (IP). The packets may form the basis for defining group types/instances, viewing the values of Abnormality Index, etc. Network interface 1080, output interface 1060 and input interface 1090 can be implemented in a known way.

RAM 1020 receives instructions and data on path 1050 (which may represent several buses) from secondary memory 1030, and provides the instructions to processing unit 1010 for execution. Secondary memory 1030 may contain units such as hard drive 1035 and removable storage drive 1037. Secondary memory 1030 may store the software instructions and data, which enable system 1000 to provide several features in accordance with the present invention.

Some or all of the data and instructions may be provided on removable storage unit 1040 (or from a network using protocols such as Internet Protocol), and the data and instructions may be read and provided by removable storage drive 1037 to processing unit 1010. Floppy drive, magnetic tape drive, CD-ROM drive, DVD Drive, Flash memory, removable memory chip (PCMCIA Card, EPROM) are examples of such removable storage drive 1037.

Processing unit 1010 may contain one or more processors. Some of the processors can be general-purpose processors which execute instructions provided from RAM 1020. Some can be special purpose processors adapted for specific tasks. The special purpose processors may also be provided instructions from RAM 1020.

In general, processing unit 1010 reads sequences of instructions from various types of memory medium (including RAM 1020, secondary memory 1030 and removable storage unit 1040), and executes the instructions to provide various features of the present invention described above. Thus, a medium providing such instructions/data may be referred to as a computer readable medium.

13. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of monitoring a plurality of resource elements of interest, said method comprising:

receiving from a user, data representing said plurality of resource elements, a set of attributes and a corresponding limit value corresponding to each of said attributes;

polling each of said plurality of resource elements to determine present value of each of said attributes;

determining deviations from corresponding baseline thresholds in operation of each of said plurality of resource elements, wherein said determining comprises comparing the present values with a corresponding limit value to determine whether said deviation is present; and computing an Abnormality Index for all of said plurality of resource elements from the determined deviations.

2. The method of claim 1, wherein said Abnormality index comprises a single number.

3. The method of claim 1, wherein said computing comprises:

receiving an event interval for generating said Abnormality Index;

checking whether deviation is present for a first attribute at the end of an event period determined by said event interval, wherein the corresponding event is determined to be active if said deviation is present at the end of the corresponding event period; and calculating a plurality of parameters for said first attribute if said event is determined to be active, wherein said Abnormality Index is determined based on said plurality of parameters for said first attribute if said event is determined to be active.

4. The method of claim 3, wherein said plurality of parameters comprise a rank value, wherein said rank value is higher if said attribute is directly related to availability compared to if the attribute is merely related to performance.

5. The method of claim 4, wherein said plurality of parameters comprises a severity index, wherein said severity index has a positive correlation with the duration of deviation within said event period.

6. The method of claim 5, wherein said threshold value is based on one of hourly baseline, daily baseline or weekly baseline, wherein said severity index is highest if said threshold value is based on weekly baseline and lowest if said threshold value is based on hourly baseline.

7. The method of claim 6, wherein each of said hourly baseline, daily baseline and weekly baseline is based on an expected behavior that is based on historical data for the corresponding duration.

8. The method of claim 6, wherein said Abnormality Index is computed with said severity index being given half weight and said rank value being given half weight for each of said attributes.

9. The method of claim 6, further comprising displaying values computed for said Abnormality Index and also a number of attributes contributing positive value for corresponding value of Abnormality Index.

10. A computer readable storage medium carrying one or more sequences of instructions for causing a network monitoring system to monitor a plurality of resource elements of interest, wherein execution of said one or more sequences of instructions by one or more processors contained in said network monitoring system causes said one or more processors to perform the actions of:

receiving from a user, data representing said plurality of resource elements, a set of attributes and a corresponding limit value corresponding to each of said attributes;

polling each of said plurality of resource elements to determine present value of each of said attributes;

determining deviations from corresponding baseline thresholds in operation of each of said plurality of resource elements, wherein said determining comprises comparing the present values with a corresponding limit value to determine whether said deviation is present; and computing an Abnormality Index for all of said plurality of resource elements from the determined deviations.

11. The computer readable storage medium of claim 10, wherein said Abnormality Index comprises a single number.

12. The computer readable storage medium of claim 10, wherein said computing comprises: receiving an event interval for generating said Abnormality Index;

checking whether deviation is present for a first attribute at the end of an event period determined by said event interval, wherein the corresponding event is determined to be active if said deviation is present at the end of the corresponding event period; and calculating a plurality of parameters for said first attribute if said event is determined to be active, wherein said Abnormality Index is determined based on said plurality of parameters for said first attribute if said event is determined to be active.

13. The computer readable storage medium of claim 12, wherein said plurality of parameters comprise a rank value, wherein said rank value is higher if said attribute is directly related to availability compared to if the attribute is merely related to performance.

14. The computer readable storage medium of claim 13, wherein said plurality of parameters comprises a severity index, wherein said severity index has a positive correlation with the duration of deviation within said event period.

15. The computer readable storage medium of claim 14, wherein said threshold value is based on one of hourly baseline, daily baseline or weekly baseline, wherein said severity index is highest if said threshold value is based on weekly baseline and lowest if said threshold value is based on hourly baseline.

16. The computer readable storage medium of claim 15, wherein each of said hourly baseline, daily baseline and weekly baseline is based on an expected behavior that is based on historical data for the corresponding duration.

17. The computer readable storage medium of claim 15, wherein said Abnormality Index is computed with said severity index being given half weight and said rank value being given half weight for each of said attributes.

18. A system for monitoring a plurality of resource elements of interest, said system comprising:

means for receiving from a user, data representing said plurality of resource elements a set of attributes and a corresponding limit value corresponding to each of said attributes; means for polling each of said plurality of resource elements to determine present value of each of said attributes;

means for determining deviations from corresponding baseline thresholds in operation of each of said plurality of resource elements, wherein said determining comprises comparing the present values with a corresponding limit value to determine whether said deviation is present; and means for computing an Abnormality Index for all of said plurality of resource elements from the determined deviations.

* * * * *